(No Model.)
W. A. FRANCISCO.
LEVEL AND PLUMB.
No. 567,539.      Patented Sept. 8, 1896.
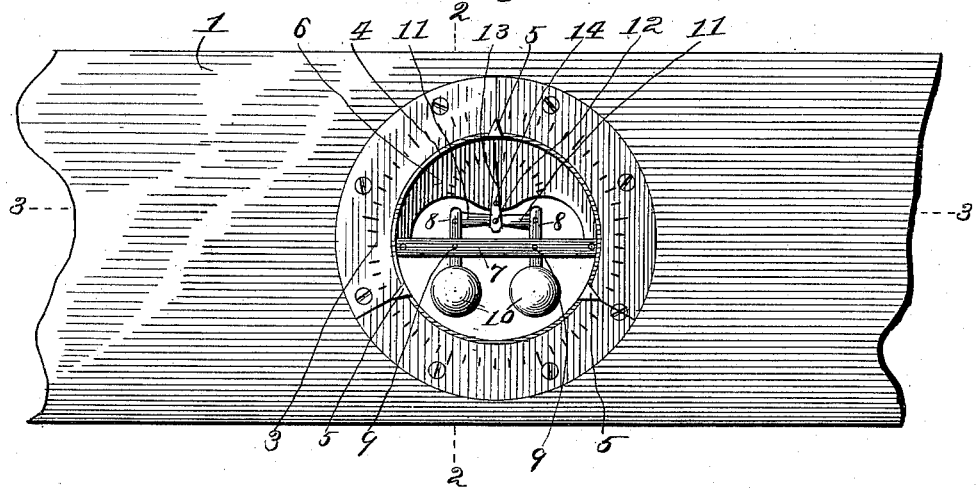
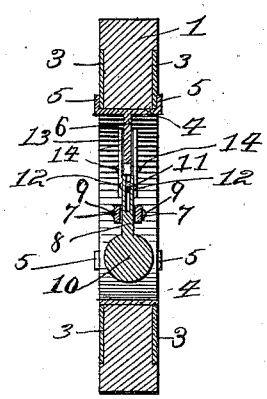
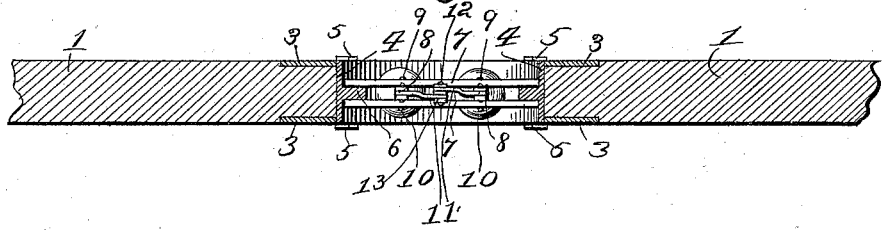
Witnesses:
Herbert Bradley
Geo. E. Cruse
Inventor
W. A. Francisco
by Knight Bros
Attorneys

UNITED STATES PATENT OFFICE.

WILLIAM A. FRANCISCO, OF HUBBARD, NEBRASKA.

LEVEL OR PLUMB.

SPECIFICATION forming part of Letters Patent No. 567,539, dated September 8, 1896.

Application filed December 20, 1895. Serial No. 572,765. (No model.)

*To all whom it may concern:*

Be it known I, WILLIAM A. FRANCISCO, a citizen of the United States, residing at Hubbard, Dakota county, and State of Nebraska, have invented certain new and useful Improvements in a Level or Plumb, of which the following is a specification.

My invention relates to a level commonly used for the ordinary purposes; and it consists, essentially, of a scale carried by a suitable frame or holder, a revoluble indicator for said scale, and a second scale and indicator carried by said revoluble indicator. This second indicator is so arranged that it also indicates the direction of the inclination of the surface as well as the degree; and my invention further consists of details of construction that will be hereinafter fully described, and specifically pointed out in the claims.

In order that my invention may be fully understood, I will proceed to describe the same with reference to the accompanying drawings, in which—

Figure 1 is a front elevation of the device. Fig. 2 is a vertical sectional view taken on the line 2 2, Fig. 1; and Fig. 3 is a horizontal sectional view taken on the line 3 3, Fig. 1.

In said drawings, 1 represents the frame or holder of the device, which may be of any suitable material or design and formed with the circular opening 2, in which is secured by any suitable means the circular scale 3. This scale is usually graduated so that each space will represent an inch, though it will be understood that any scale of measurement may be used.

4 represents a circular strip of metal placed in the opening and adapted to be turned therein, and it is held in the opening by means of the lips 5. These lips serve as indicators when it is desired to use the device on an inclined surface, and it is accomplished by turning the strip until the lip 5 is adjusted to the angle of the incline, which may be easily determined by the graduations on the scale.

6 represents a graduated segment carried by the circular strip, and 7 represents strips or cross-pieces which are secured to the ends of the segment.

8 represents a pair of parallel arms pivoted at 9 between the strips or cross-pieces 7 and provided at their lower ends with weights 10. At the upper ends of the arms 8 the arms 11 are pivoted, which extend in a horizontal direction toward each other and have eyes formed on their free ends, through which a pin 12, carried by the indicator 13, passes. The indicator 13 is pivoted on the segment at 14 and works over the scale on the segment. This arrangement of the vibrating indicator renders it very sensitive, and it also avoids the objection of vibration of the indicator when only one arm is used, as in the ordinary level. The scale on the segment is preferably of the same denomination as the circular one, but is divided into smaller parts, so that the slightest amount of unevenness will be indicated.

It will be seen from the above arrangement that the device can be used for the ordinary purpose of ascertaining whether a horizontal surface is level or not, without regard for the revoluble strip, and should there be any inclination in the surface it will be easily detected by the central indicator, which will by reason of the parallel arms also indicate in which direction the unevenness occurs.

When the device is used on an inclined surface, the revoluble strip is adjusted on the circular scale to the proper degree of inclination, and when the device is applied to the surface the central indicator will readily show whether there is any unevenness, as well as the amount.

For use as a plumb the revoluble strip is turned ninety degrees or adjusted at any proper inclination therefrom in order to plumb vertical surfaces or indicate variations from a vertical plane.

Having thus fully described my invention, the following is what I claim as new therein and desire to secure by Letters Patent:

1. A level or plumb composed of a suitable frame or holder carrying a scale, an indicator for said scale and adapted to be adjusted around the same, a second scale carried by said indicator, and a vibrating indicator for said second scale, substantially as shown and described.

2. In a level or plumb the combination of a suitable frame or holder, a scale carried by said holder and an indicator for said scale, and a pair of parallel and pivoted weighted levers connected with said indicator, substantially as shown and described.

3. The combination of a suitable frame or holder, a scale carried thereby, a revoluble scale carried by said circular scale and provided with an indicator, and a swinging indicator carried by said revoluble scale consisting of a pair of pivoted parallel arms having weights at their lower ends, and arms connecting said weighted arms with the indicator, substantially as and for the purpose set forth.

4. The combination of a suitable frame or holder, having an opening, a scale surrounding said opening, a strip carrying an indicator for said scale fitting in said opening and adapted to be turned therein, a scaled segment carried by said strip and having its ends connected by cross-pieces, a pair of parallel weighted levers pivoted on said cross-pieces, a pivoted indicator for said segment and a suitable connection between the pivoted levers and indicator, substantially as shown and described.

WILLIAM A. FRANCISCO.

Witnesses:
B. B. GRIBBLE,
J. E. BROWN.